United States Patent [19]

Behringer

[11] Patent Number: 4,472,102
[45] Date of Patent: Sep. 18, 1984

[54] LOADING COAL IN OPEN HOPPER BARGES

[75] Inventor: Thomas E. Behringer, Jeffersonville, Ind.

[73] Assignee: American Commercial Terminals, Inc., Jeffersonville, Ind.

[21] Appl. No.: 440,267

[22] Filed: Nov. 9, 1982

[51] Int. Cl.³ ............................................. B65G 67/00
[52] U.S. Cl. ...................................... 414/786; 193/3; 414/139; 414/299
[58] Field of Search ............... 414/137, 139, 140, 144, 414/293, 299, 786; 193/3; 222/564; 406/157, 161

[56] References Cited

U.S. PATENT DOCUMENTS

| | | |
|---|---|---|
| 455,328 | 7/1981 | Herbert . |
| 1,068,006 | 7/1913 | Pottinger ........................ 414/293 X |
| 1,768,247 | 6/1930 | Gardner .................................. 193/3 |
| 2,050,774 | 8/1936 | Wilcox . |
| 3,926,290 | 12/1975 | Isojima et al. .................. 414/139 X |
| 3,945,511 | 3/1976 | Delorme ............................ 414/293 |
| 4,274,527 | 6/1981 | Baker ................................ 414/299 X |

FOREIGN PATENT DOCUMENTS

| | | | |
|---|---|---|---|
| 312614 | 5/1929 | United Kingdom ..................... 193/3 |
| 429598 | 5/1935 | United Kingdom ................ 414/139 |
| 443292 | 2/1936 | United Kingdom ..................... 193/3 |

Primary Examiner—Leslie J. Paperner
Attorney, Agent, or Firm—Laurence R. Brown

[57] ABSTRACT

Problems of spontaneous combustion and acid corrosion in coal carrying open hopper steel barges are significantly reduced by loading a mixture of coal of various particle sizes in the hopper without segregating and isolating groups of particles of different sizes. This reduces the air circulation paths through the loaded coal and prevents the supply of oxygen necessary for feeding both spontaneous combustion and acid corrosion. A preferred embodiment of the invention comprises spreader-deflector means between a chute and the barge hopper floor that distributes the coal particle mixture in a substantially flat loading pattern that eliminates prior art conical patterns tending to create an air flow chimney effect encouraging spontaneous combustion and acid corrosion.

3 Claims, 5 Drawing Figures

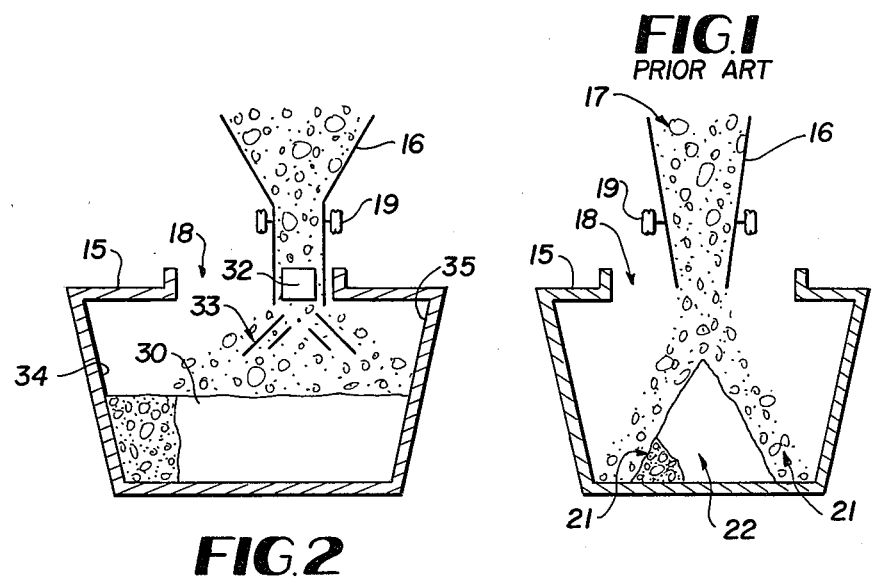
FIG.1 PRIOR ART
FIG.2
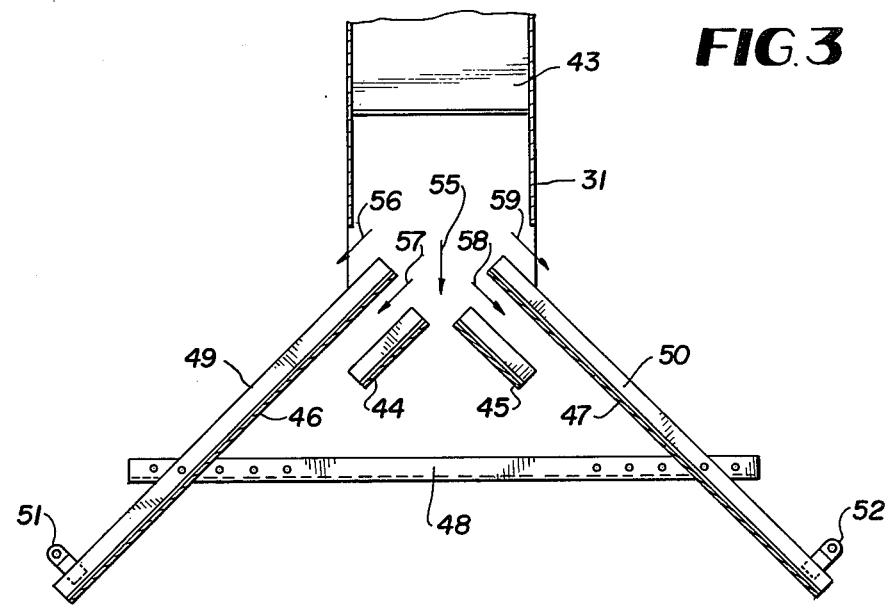
FIG.3

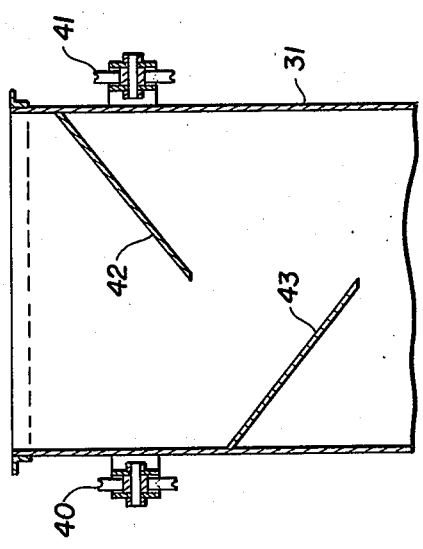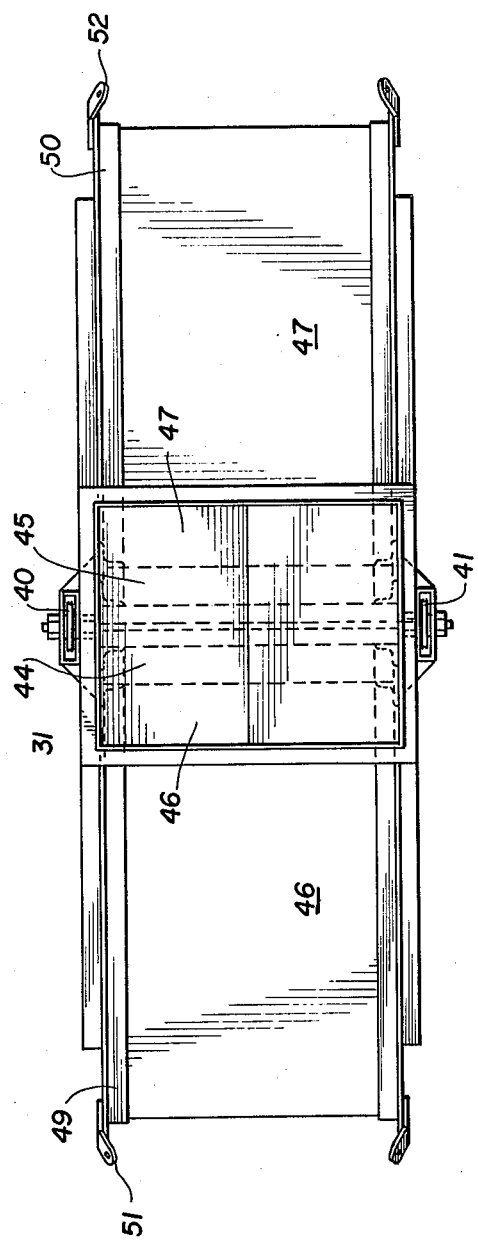

LOADING COAL IN OPEN HOPPER BARGES

TECHNICAL FIELD

This invention relates to transportation of coal in open hopper barges, and more specifically it relates to the manner of loading coal into the barges.

BACKGROUND ART

Two unresolved problems are associated with transportation of coal in open hopper steel barges, namely spontaneous combustion and acid corrosion.

Spontaneous combustion occurs when heat balances become disturbed. Hydration, oxidation and bacterial decomposition all release heat in a coal pile. If this heat is not lost by convection and conduction to the outside air, the heat can build up to ignite the coal. Historically, under certain conditions, fires have developed from spontaneous combustion in the coal carried in open hopper barges, and there has before this invention been no adequate solution to prevent such fires.

Coal contains iron pyrite, a sulfur containing compound, which when the coal in the open hopper barges is subjected to rainfall, because of existing conventional conditions encountered in barge transportation of coal produces sulfuric acid solutions on the barge bottom.

The exposure of steel to acid, in an oxygen environment has caused a severe corrosion problem which is further accelerated by the heat being released by the previously mentioned reactions. This severe corrosion problem occuring within steel barges has likewise had no adequate solution in the prior art.

Thus, it is an object of this invention to solve the foregoing problems of spontaneous combustion and acid corrosion in coal carrying open hopper steel barges.

It is desirable to load barges rapidly as compared with discharge into cellars as taught in R. W. Wilcox U.S. Pat. No. 2,050,774, Aug. 11, 1936. In this patent deflectors are used at the end of a chute to slow down coal delivery to prevent dust.

Also, as will hereinafter be shown, a conical unloading pattern such as attained by this type coal loading chute is undesirable for use in barges to resolve the aforesaid major problems.

DISCLOSURE OF THE INVENTION

A common factor embraces the two problems set forth, namely that both spontaneous combustion and acid corrosion of the barge steel require a source of oxygen. Studies of the barge coal loads reveals that there is conventionally a chimney effect that circulates air through the coal piled in the barge and thus supplies the oxygen necessary to support the combustion and corrosion. This is unexpected if the construction of the open hopper barge as an open topped flat walled container is considered. This invention therefore provides for the reduction of the air circulation through the coal piled in the barge.

Further consideration of the air circulation problem shows that conventional barge loading techniques tend to isolate particles of different size into separate regions. An example of this conventional coal delivery chute art is found in G. J. Herbert U.S. Pat. No. 455,328, July 7, 1891. The most common pattern is a set of concentric cone sections with coarser particles outside and smaller firmly packed particles inside. This permits build-up of heat in the central cone by bacterial and chemical reactions in a manner which also encourages the production of sulfuric acid. Also, it provides between the coarser particles of the outer core portions an air flow flue like passageway which carries the necessary oxygen through the pile to support the spontaneous combustion and the acid corrosion. To resolve the problems therefore, this invention loads coal into the open hopper barges without isolated separation of particles of different sizes, thereby to remove the source of oxygen necessary to cause the hereinbefore mentioned problems.

In order to eliminate the chimney effect and the oxygen supply therefore a mixture of coal of various size particles is conveyed into the barge and is spread over the hopper during loading without isolation of the particle sizes therefore providing a compact mass against the barge walls through which air currents do not freely flow. It has been found in accordance with this invention that the particles are substantially equally distributed over the hopper by means of deflector chute or tube and the hopper bottom level to load the coal over a substantially flat surface loading pattern. This eliminates the coning effect which results from delivery of coal directly from the chute, which tends to bounce larger particles outwardly and to concentrate fines in an inner cone. A typical embodiment of the invention therefore comprises a spreader which is a deflector attachment for a coal delivery chute having several deflector plates for distributing coal outwardly in a flat loading pattern to avoid the coning pattern.

Other features, advantages and objectives of the invention will be found throughout the following description, the drawings and the claims.

BRIEF DESCRIPTION OF THE DRAWINGS

In the drawings:

FIG. 1 is an end section diagrammatic view of an open hopper steel barge with conventional coal loading patterns;

FIG. 2 is an end section diagrammatic view of an open hopper steel barge employing loading means and method of this invention; and FIGS. 3, 4 and 5 are respectively elevation section view, side section segmental view, and plan view of spreader deflecting means provided by this invention.

THE PREFERRED EMBODIMENTS

The FIG. 1 showing provides background to understand the nature of the prior art problems solved by this invention and the nature of the discoveries and particular solution of the problems afforded by this invention. Thus, a steel open hopper barge end section 15 is sketched showing diagrammatically by means of chute 16 the loading of coal 17 into the barge hopper 18. The chute is moved and positioned by means not shown cooperating with sheaves 19 from time to time to proper positions for filling the hopper.

As may be seen from the loading pattern displayed a conical stack of coal piles up under the chute 16 in the hopper. It has been found in solving the prior art problems by this invention that this loading technique tends to create concentric cones 20, 21, where the inner cone(s) concentrates and segregates the coal fines or smaller particles and the outer cone(s) concentrate and segregate the larger particles or chunks of coal. This leads to a condition where heat can build up in the center cone 20 without adequate dispersement by ventilation. Not only does this result in spontaneous combustion but also it favors the conditions necessary to convert sulfur in the coal to sulfuric acid.

Furthermore, even more important is the chimney effect created by the cones with the larger particles. Thus, the air space between larger chunks encourage an air flow pattern through the cone 21 intensified by thermal gradients. This results in a supply of oxygen in the hopper and particularly at the interface 22 which will feed combustion and encourage the spontaneous combustion when the temperature of the inner cone 20 rises. Upon discovery of this action and study, it was determined that it was desirable to prevent circulation of air through the coal in the hopper. That is a difficult task in the case of the open hopper steel barges usually used to carry coal because the supply of air cannot be cut off with a cover. Accordingly, applicant in his search for a feasible solution under the circumstances encountered in the trade, discovered that the air flow paths and resulting chimney effect could be substantially eliminated by loading the coal in the barge hopper with a substantially uniform mixture of particle sizes and without significant isolation of particles of different size into different zones or layers, as shown for example in the bottom loaded zone 30 of the hopper in FIG. 2.

It has also been discovered by applicant that this desirable coal cargo pattern can be obtained by spreading the coal during loading over a substantially flat surface (termed herein flat loading) thereby avoiding the concentric conical patterns of the nature shown in FIG. 1. A preferred way of flat loading that distributes coal particles of different sizes substantially equally over a hopper is to provide a spreader-deflector array 31 between the coal delivery chute 16 and the hopper.

Accordingly, a set of deflectors 32 deflecting the incoming coal particles within the chute part of the spreader 31 in and out of the plane of the drawing, together with the set of spaced deflectors 33 which deflect the particles right or left as seen in the drawing has provided a wider range substantially flat loading pattern that distributes particles in a hopper in a way discouraging air current flow paths. This preferred embodiment of the invention therefore packs the coal particles against walls 34 and 35 of the hopper in a substantially uniformly distributed mass of particles that significantly decreases the incidences of spontaneous combustion and acid corrosion.

To better understand the nature of the solution to the problems of the prior art, consider the reactions taking place in the coal cargo loaded as in FIG. 1. The normal processes of hydration, oxidation and bacterial decomposition taking place in a coal cargo will generate heat. The heat itself accelerates bacterial decomposition and acidation. If the heat is dissipated by convection, conduction or radiation to the extent that combustion temperatures are not reached, there can be no spontaneous combustion. The central fines cone 20 causes excessive heat to build up. This in turn causes thermal convection at the boundary 22 bringing in oxygen from cooler porous outer portions of the coarse coal cone(s) 21 as sucked into the open top of the hopper. This further aids oxidation and bacterial decomposition and feeds combustion when combustion temperatures are reached.

Sulfuric acid forms from oxidized iron pyrite in the coal, and is carried throughout the hopper by rainwater leaking down the stack of coal. Bacteria in the coal aids as a catalyst in the formation of the acid. Circulating air as a source of oxygen also aids this process. Furthermore, the acid corrosion of the steel barge hull takes place where oxygen is available from the circulating air.

Thus, the reduction of air circulation in the coal cargo aids in various ways to reduce spontaneous combustion and acid corrosion of the steel hull.

A preferred embodiment of the spreader-deflector means 31 of FIG. 2 is shown in FIGS. 3 to 5. As seen from FIGS. 3 and 4 a rectangular chute extension 31 manipulated by sheaves 40, 41 has a pair of deflecting plates 42, 43 thereinside to deflect the coal particles in such a way that the particle sizes are not segregated into zones and are oriented in a direction perpendicular to the lower sets of deflector plates 44, 45 and 46, 47 mounted at the outlet mouth of the chute 31 by means of framework members 48 to 50, etc. Tabs 51, 52 and sheaves 40, 41 can retain hooks, harnesses, etc. for help in locating the mouth of the chute above the load level of the hopper to thereby distribute the coal in the flat loading manner previously described.

Note that deflector plates 44–47 are arranged to pass part of the coal being loaded via chute 31 along axis 55 and into a plurality 56–59 to achieve a wide span flat loading of the nature hereinbefore described. The span of distributed particles can be seen from the plan view of FIG. 5 which has an overall length in the order of twelve feet (3.6 M) and a width in the order of four feet (1.2 M) for typical barge loading service.

Having therefore described the nature of the advance over the art afforded by this invention, those novel features believed descriptive of the spirit and scope of the invention are defined with particularity in the claims.

I claim:

1. The method of eliminating spontaneous combustion and acid corrosion in the transportation of sulphur containing coal caused by conical loading into open hopper steel barges, comprising the steps of:

conveying to the barge for loading thereinto by chutes a coal mixture of various size coal particles, and preventing oxidation of the coal and sulfur loaded on the barge to prevent fires and acid corrosion by eliminating air flow passageways through loaded coal established by respective concentration of fines and larger coal particles in different zones in the loading process by loading the mixture into the barge through the chutes uniformly in a flat loading pattern packing the coal particles against the barge walls and over the open hopper loading area of the barge without coning and without significant isolation of particles of different size, thereby to modify air flow patterns established through coal loaded conically and to eliminate the chimney effect which would supply oxygen in a manner that would be likely to support combustion and acid corrosion.

2. The method defined in claim 1 wherein the coal loading step comprises the feeding of coal through a conveyor into a deflector chute having two sequentially encountered sets of deflector members oriented to deflect coal in substantially normal directions, thereby to distribute coal particles of different sizes substantially uniformly over the hopper loading area in said substantially flat surface loading pattern.

3. The method defined in claim 2 including the step of passing the coal through a closed chute containing the first sequentially encountered set of deflector members to produce a zig-zag flow pattern of the coal through the closed chute before encountering the second set of deflector members.

* * * * *